United States Patent
Braceras et al.

(10) Patent No.: US 6,754,791 B1
(45) Date of Patent: Jun. 22, 2004

(54) CACHE MEMORY SYSTEM AND METHOD FOR ACCESSING A CACHE MEMORY HAVING A REDUNDANT ARRAY WITHOUT DISPLACING A CACHE LINE IN A MAIN ARRAY

(75) Inventors: George Maria Braceras, Colchester, VT (US); Lawrence Carey Howell, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1826 days.

(21) Appl. No.: 08/599,227

(22) Filed: Feb. 9, 1996

Related U.S. Application Data

(63) Continuation of application No. 08/071,168, filed on Jun. 1, 1993, now abandoned.

(51) Int. Cl.[7] .............................................. G06F 12/00
(52) U.S. Cl. ...................... 711/159; 711/118; 711/133
(58) Field of Search ................................ 395/460, 463, 395/469, 470, 474, 486, 487, 412, 415, 421.03; 364/246.12, 964.342; 365/189.07; 711/3, 118, 123, 133, 154, 159

(56) References Cited

U.S. PATENT DOCUMENTS

| | | | | |
|---|---|---|---|---|
| 4,197,580 A | * | 4/1980 | Chang et al. | 364/200 |
| 4,637,024 A | * | 1/1987 | Dixon et al. | 371/67 |
| 4,751,656 A | * | 6/1988 | Conti et al. | 364/488 |
| 5,070,502 A | * | 12/1991 | Supnik | 371/11.1 |
| 5,297,094 A | * | 3/1994 | Rastegar | 365/210 |
| 5,301,153 A | * | 4/1994 | Johnson | 365/200 |
| 5,341,381 A | * | 8/1994 | Fuller | 371/10.1 |
| 5,367,655 A | * | 11/1994 | Grossman et al. | 365/230.23 |
| 5,497,347 A | * | 3/1996 | Feng | 365/189.07 |

OTHER PUBLICATIONS

"Memory System Reliability Improvent through Associative Cache Redundancy" M. A. Lucente et al; I.EE.E Journal, vol. 26, No. 23, Mar. 1991.*

* cited by examiner

*Primary Examiner*—Tuan V. Thai
(74) *Attorney, Agent, or Firm*—Mark E. McBurney; Bracewell & Patterson, L.L.P.

(57) ABSTRACT

A system and method for accessing a cache memory having a redundant array without displacing a cache line in a main array are described.

Redundant rows of a cache memory array are used as extra cache lines for the cache memory array. Operations can be performed on these extra cache lines without effecting previous cache line values which have been brought into the cache memory array. These extra cache lines thus provide for temporary cache storage without causing a cache line reloaded into the cache memory array. This selective access of memory without disturbing the current contents of the cache memory array increases system throughput by minimizing the number of times that a cache memory might have to be reloaded.

13 Claims, 4 Drawing Sheets

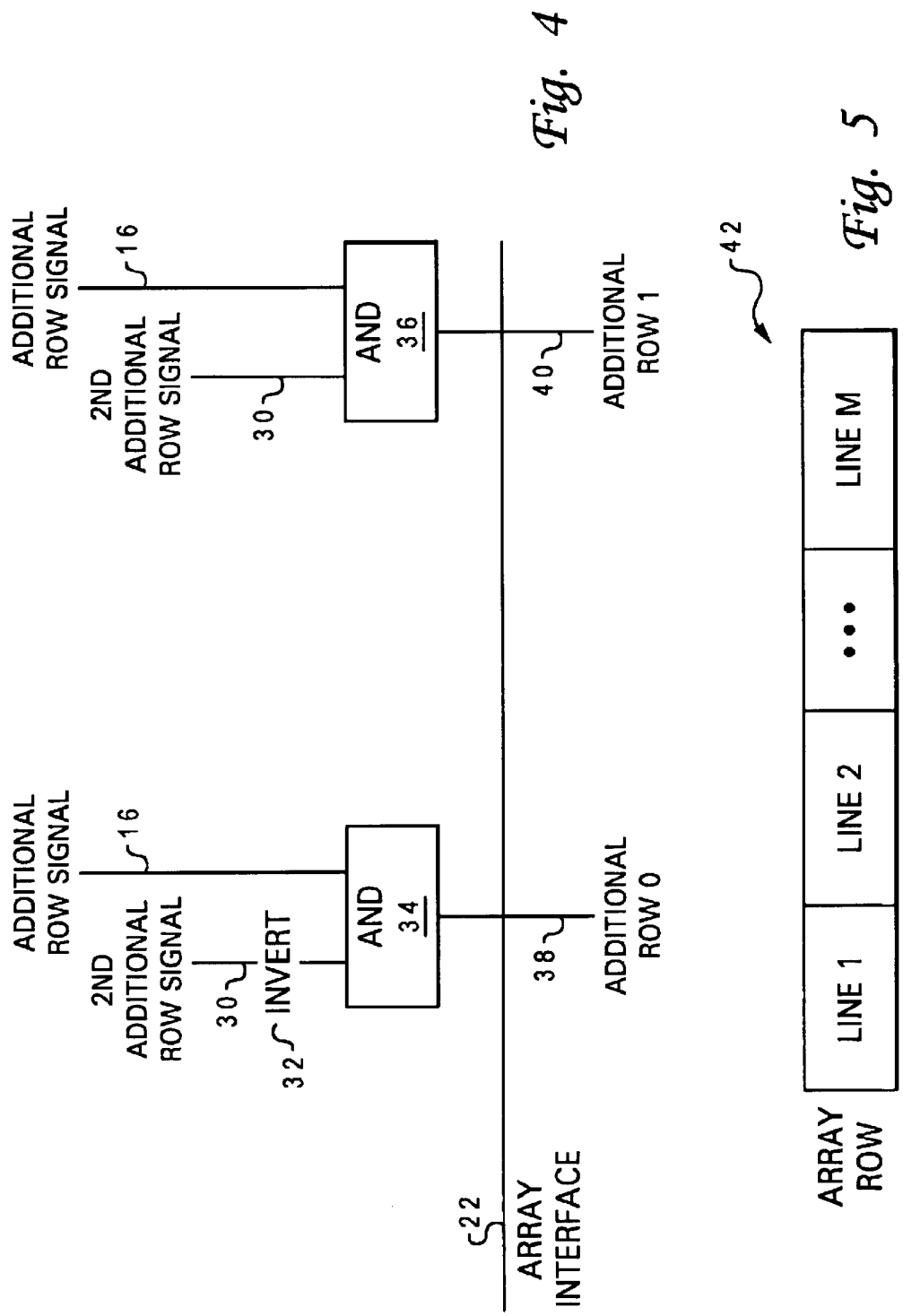

US 6,754,791 B1

CACHE MEMORY SYSTEM AND METHOD FOR ACCESSING A CACHE MEMORY HAVING A REDUNDANT ARRAY WITHOUT DISPLACING A CACHE LINE IN A MAIN ARRAY

This is a continuation, of application Ser. No. 08/071,168, filed Jun. 1, 1993 now abandoned.

TECHNICAL FIELD

The present invention relates to data processing systems, and more particularly to memory caches used by such data processing systems.

BACKGROUND OF THE INVENTION

A cache is a small, fast memory that acts as a buffer between a device that uses a large amount of memory and a large, slower main memory. The cache's purpose is to reduce average memory-access time. Caches are effective because of two properties of software programs: spatial and temporal locality. Spatial locality asserts that because programs are generally composed of subroutines and procedures that execute sequentially, they often use data and instructions whose addresses are proximate. Temporal locality recognizes that since many programs contain loops and manipulate data arranged in lists and arrays, recently used information is more likely to be reused than older information.

Memory caches are used in a data processing system to improve system performance by maintaining instructions and/or data that are statistically likely to be used by a microprocessor or execution unit within such data processing system. Such likelihood of use is generally found to exist with instructions/data in close proximity to the currently executing instruction or currently accessed data. Referring to FIG. 1, high speed memory cache 11 is used to quickly provide such instructions or data to the microprocessor or CPU (execution unit) 9, and thus to minimize delays that would be introduced if the processor were required to access slower main memory 13. This slower main memory could be such things as dynamic RAM, a read only memory (ROM), an electrical, magnetic or optical disk or diskette, or any other type of volatile or non-volatile storage device known in the art.

The contents of a memory cache must be periodically replenished with instructions/data from main memory. The rate of data transfer between a cache and main memory can be greatly increased by using block data transfers to move information between them. Cache memory is typically organized into lines of data, with each line comprising a plurality of bytes or words of data. A line is used so that groups of bytes/words are transferred to/from cache instead of a single byte/word. For example, each cache line could have 32, 64 or 128 bytes of data. With a 32 byte cache line, 32 bytes can be fetched using a single block data transfer from the main memory each time a cache miss occurs.

A cache miss occurs whenever the cache does not contain an instruction or data needed by the CPU. When a cache miss occurs, the present cache line is reloaded from the slower memory/storage device with the requested value and n−1 bytes/words of instructions/data that immediately follow such requested value, where n is the size of the cache line.

However, at times it would be advantageous to fetch a line from memory for certain load/store operations without displacing or overwriting a line presently in the cache. This requirement for non-displacement could occur, for example, when performing matrix operations on data contained in a cache. If a cache miss occurs when accessing non-matrix data, it would be advantageous to not disturb the existing matrix data while accessing this non-matrix data value. This requirement for non-displacement could also occur if it is known that the line to be loaded may not be used again for a long time (e.g. updating a page frame table), or if only one word needs to be read from memory infrequently. Presently known systems do not allow for selective memory access which can preempt a cache line reload.

SUMMARY OF THE INVENTION

It is therefore an object of the present invention to provide an improved data processing system.

It is a further object of the present invention to provide for improved performance in a data processing system.

It is yet a further object of the present invention to provide an improved cache in a data processing system.

It is still a further object of the present invention to minimize the number of cache line reloads required in a data processing system.

It is yet another object of the present invention to selectively access memory while preempting a cache line reload.

An additional line is provided within the data cache by using one of the redundant rows of the storage array. An input signal for the storage array indicates when this additional line is accessed. All operations which can be performed on the other rows of a cache array can also be performed for this additional line.

If array set associativity is considered, then more than one line can be placed into a row. For example, with 4-way set associativity a total of four additional lines can be brought into the additional row. Using such an array redundant row to provide the extra line of cache line is superior to traditional methods of expanding a cache to include more lines. These traditional methods required the addition of registers, multiplexors and control logic that correspond to the additional cache line to be added. By using an array redundant row as an additional cache line, the amount of physical space taken, and resulting wiring congestion, is minimized.

A one-way set associative array will be described-herein for ease in understanding, but there is nothing to preclude extending it to M-way and thus allowing for more "additional lines".

BRIEF DESCRIPTION OF THE DRAWINGS

FIG. 4 shows the array control logic of the array block for two additional redundant unmapped rows.

FIG. 5 depicts an array row having plural lines when set associativity is used.

DETAILED DESCRIPTION OF THE PREFERRED EMBODIMENT

The data cache main array described herein contains 8 rows. Each row contains a 256-byte line of data. An additional line(s) is provided from the redundant row section of the cache chip and operations performed on this additional line(s) without affection the contents of the main array rows. Although the term row is used, it is not meant to be limited to any particular physical orientation. Memory organized in columns, ;diagonals, or any other type of physical orientation could similarly use the techniques described herein. Row is merely meant to mean a plurality of memory locations that can be accessed or operated upon using a single operation such as read, write, flush, etc.

Figure 2:
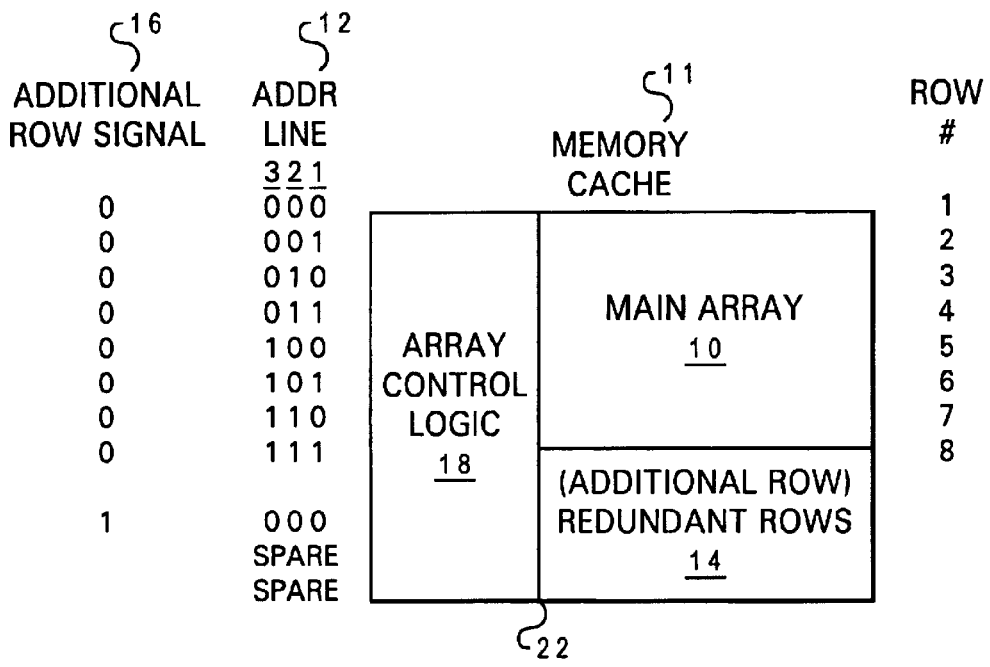
FIG. 2 shows the overall array block and control interfaces of a cache.

FIG. 2 depicts a memory cache 11 of the preferred embodiment. The main array 10 contains three address lines 12 which can address a total of eight rows. The redundant rows 14 are typically used in the event that one of the main array's rows are faulty. If a failure is determined in the main array, then one of the spare/redundant rows 14 is used to bypass the faulty row in the main array 10 during the manufacturing process. The rows containing the bad bits are disabled, typically by blowing fuse links, and the redundant rows are enabled to take their place. To be able to substitute a spare/redundant row for one in the main array, the spare/redundant row must have the same logical appearance as the row it replaces. Thus, the spare/redundant row 14 is logically overlayed when mapping the spare/redundant row to the logical location of the main array's faulty row or column. This redundant replacement is commonly known in industry, as exemplified by U.S. Pat. No. 4,630,241 and pending U.S. Pat. application Ser. No. 731,487, filed Jul. 17, 1991 now U.S. Pat. No. 5,297,094, entitled "Integrated Circuit Memory Device with Redundant Rows". (and having a European counterpart patent application EP 523,996-A1), both hereby incorporated by reference.

Array control logic 18 (more fully described below with reference to FIG. 3) is implemented so that the redundant row 14 has the same logical function as any other row within the main array 10. Since the redundant row 14 has the same logical appearance as a main array row, it can be made to appear as an "additional row" to the main array. Thus, redundant rows which have not been mapped as substitutions for faulty rows can be used as additional rows/cache lines, thereby providing a logical extension to the main array. These redundant unmapped cache lines 14 can then be used as temporary cache locations without displacing or overwriting the cache's main array contents.

An "additional row" input signal is provided at 16. As will be later described, this signal 16 is generated by the cache controller and set depending upon whether the requested line is in the main array 10 or outside the main array and in the redundant row area 14 (bypassing the main array). This signal can also be thought of as the "high-order" address bit for the array. If the signal is set to a logical "0", then the access is to the main array; whereas, if the signal is set to a logical "1" the "additional row" is accessed.

Figure 3:
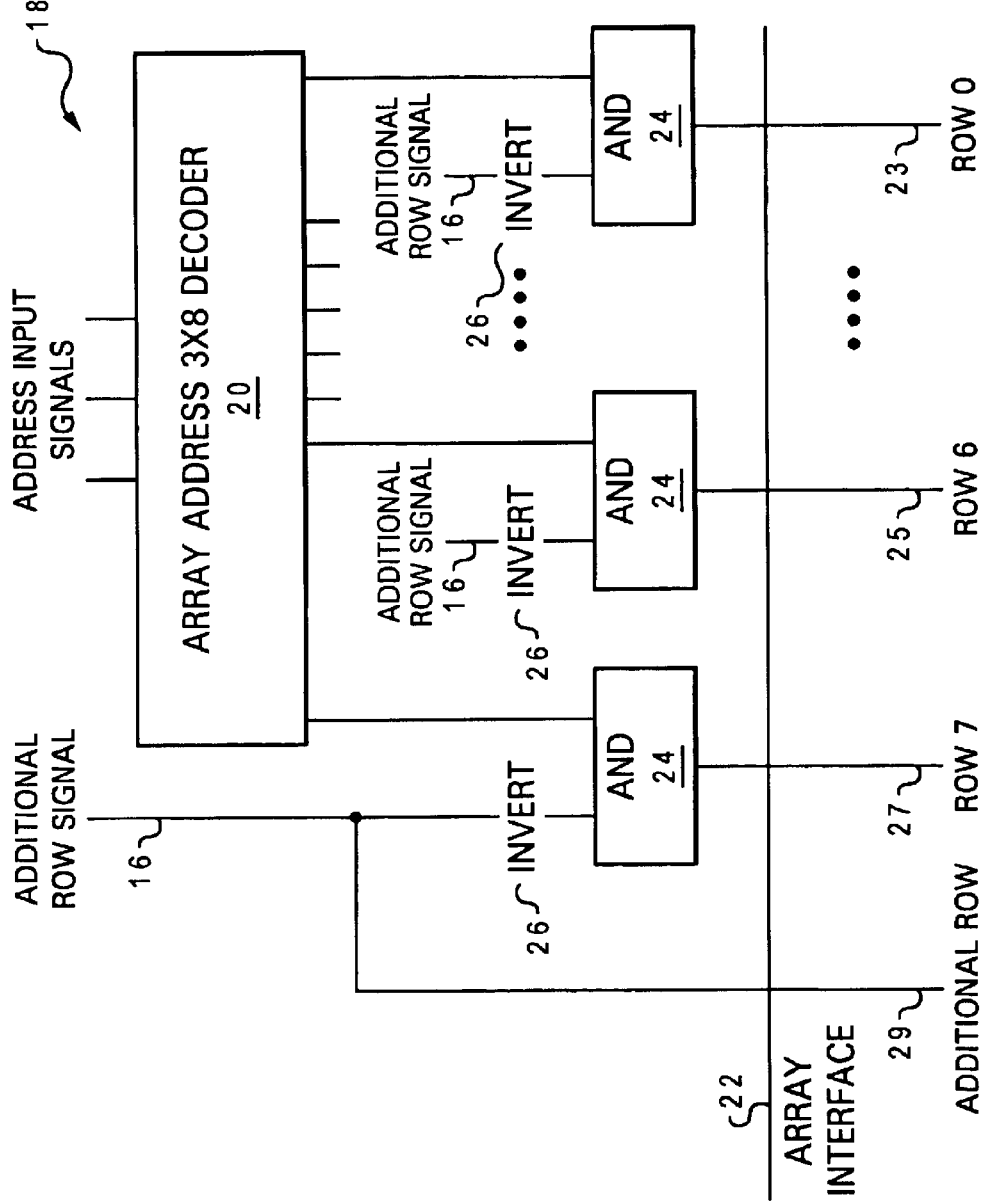
FIG. 3 shows the array control logic of the array block for one additional redundant unmapped row.

FIG. 3 depicts the array control logic 18, comprising array address decoder 20 and the array interface 22. The array address decoder is extended to handle the additional row signal 16. This extension is accomplished by logically AND-ing at 24 the outputs of the array address decoder 20 with the additional row signal 16, which is generated by the cache controller. This additional row signal is inverted at 26 prior to the AND operation at 24. The outputs of the AND operation, shown at 23, 25 and 27, are signals used to access/enable the respective rows (0–7) in the main array 10. The additional row signal 16 is used to access/enable the additional unmapped row in the redundant rows 14 portion of the cache 11.

The cache controller 18 must be told when it is to place a line in the "additional row" of the redundant row area. This is accomplished by allocating a bit within all CPU instructions which can cause a reload from memory (i.e. load, store, zero line) to the cache. For example a 10 bit instruction may look like that shown in Table 1, where bit 5 is used for accessing the additional row.

TABLE 1

| Load instruction: | LD | Addit.row | Address |
|---|---|---|---|
| | 1011 | 1 | 11110 |

Figure 1:
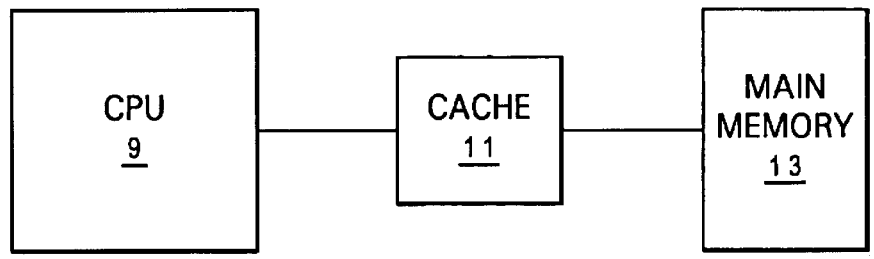
FIG. 1 shows a data processing cache and control system

A programmer writing an application program (or an intelligent compiler or operating system which is managing this selective cache) sets this bit to "1" to indicate that the line coming from memory should be placed into the additional row. Otherwise, if the bit is "0" the line is to be placed in the main array 10. CPU 9 (of FIG. 1) interprets this bit in the opcode, and signals the control section of the cache accordingly, as describe above.

This bit's value is then stored along with the line's address in the tag table as shown below in Table 2.

TABLE 2

| TAG TABLE ENTRY | |
|---|---|
| Additional row | line's memory address |
| 0 or 1 | xxxxx |

Whenever a "cache hit" occurs for this line's address, the "additional row" bit previously stored in the tag table is sent from the controller along with the corresponding address bits to the cache. If the "cache line" needs to be stored back to memory, the same cache addressing scheme is used (i.e. the additional row bit is sent with the address to indicate which line to access). The above described scenario is applicable whether an execution unit store/load is occurring, or a cache reload/storeback is occurring, as no extra provisions are required to handle the "Additional Row" versus the Main Array operations.

Note that in the above scenario the programmer only has to identify initially if the line is to be placed in the additional row and doesn't require any further monitoring or actions on his part.

If more "additional rows" are designed into the array then nothing precludes their being accessed by the controller. In order to accommodate a second "additional row" the following changes are made.

A "2nd additional line" address bit is allocated within the instruction, in a manner similar to that described above with reference to Table 1. The tag table (of Table 2) is widened by 1 bit to accommodate this new line. The use of an "Additional Row Signal" to indicate when to use the redundant row area is still maintained, however. If the "Additional Row Signal" is active or enabled, the access will still be to the redundant rows. If the "2nd additional row" signal is a logical "0", the additional row 0 is accessed, while if the signal is a logical "1", the additional row 1 is accessed.

The additional row signal 16 of FIG. 3 is expanded to that as shown in FIG. 4. A "2nd additional row" signal is provided at 30. This signal 30 is inverted at 32, and then logically AND-ed at 34 with the additional row signal 16. The output of the AND 34 is a signal 38 used to access/enable additional unmapped row 0 of rendundant rows 14. In a similar manner, the "2nd additional row" signal 30 is logically AND-ed at 36 with the additional row signal 16. The output of the AND 36 is a signal 40 used to access/enable additional unmapped row 1 of redundant rows 14.

The number of additional rows can be expanded further, but in this case it is preferable to start encoding the 2nd, 3rd, . . . etc. address bits and their corresponding signals, using traditional methods such as using a 2-to-4 way or 3-to-8 way encoder, to reduce the logical overhead. This may be accomplished using traditional techniques known in the art.

For an M-way set associative array, a row would contain M lines, as shown at 42 in FIG. 5. Therefore, more than one "additional" line can be brought into the redundant row if set associativity is used. Although set associativity is generally known in the art, a simple example will show how the present invention co-exists with set associativity.

Figure 6:
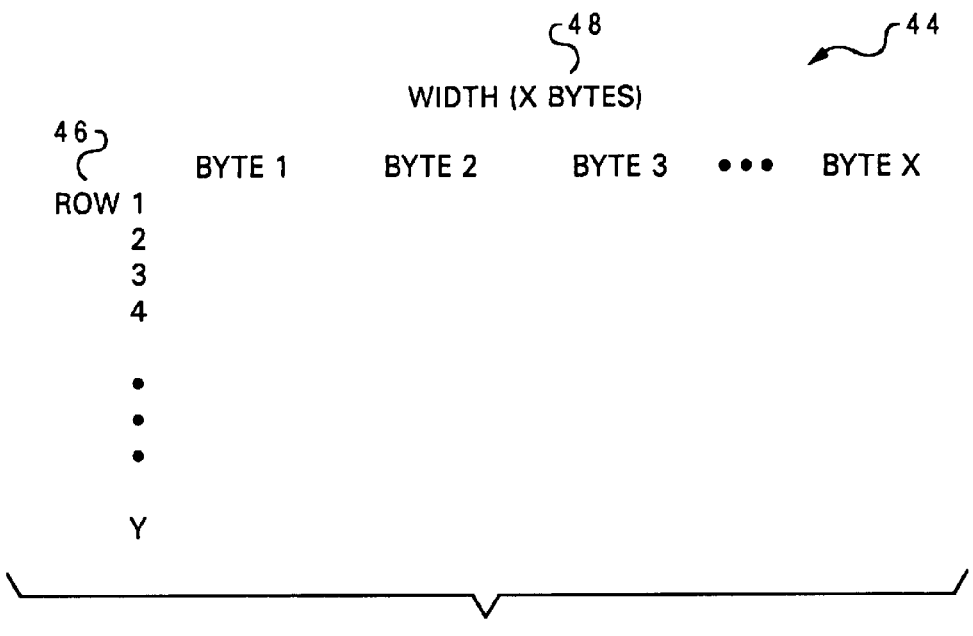
FIG. 6 shows a 1-way set associative cache organization.

Referring to FIG. 6, an array 44 is made up of Y rows at 46 with each row containing X bytes at 48. In order to access a given byte, a row address (1–Y) and a byte address (1–X) must be specified. If a line is defined to be an entire row, then its length will be X bytes. For this case, a line and row would have the same meaning.

Figure 7:
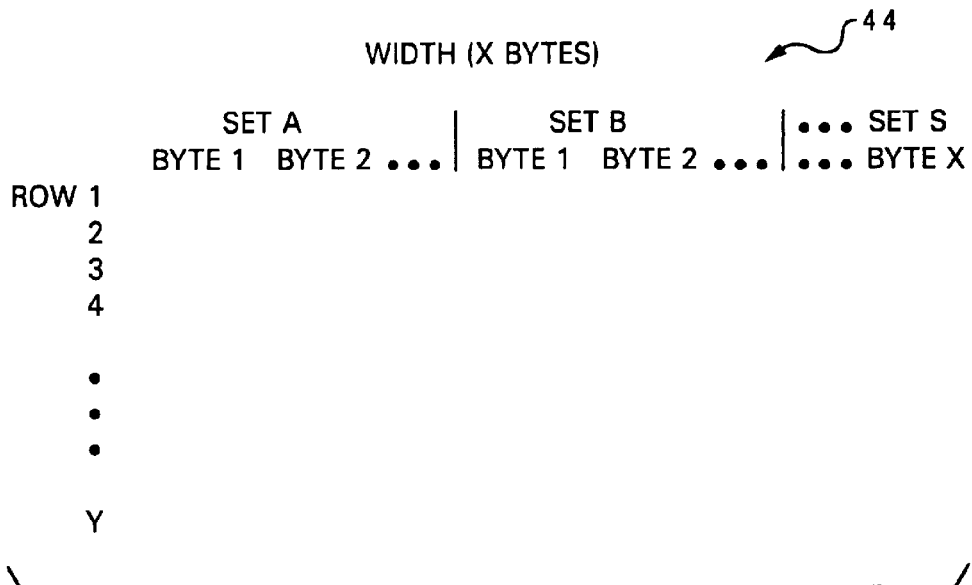
FIG. 7 shows an M-way set associative cache organization.

If set associativity is used, than the array 44 is divided into additional groupings based upon how many sets S are chosen, as shown in FIG. 7. The width of a set is X/S bytes (where X is the total byte length for a row), and this value becomes the new line length. Therefore, an array row with S sets will contain S lines. In order to access a given byte, a row address, set number, and a byte address within the set must be specified by the cache controller. Since a redundant row has the same characteristics (i.e. width and addressing) as a row in the main array, the redundant row has the same set associativity scheme as well. Therefore, using the redundant row to store additional line(s) will similarly extend to set associativity, and the redundant unmapped row is able to store or otherwise maintain S lines using the same techniques as described above for 1-way set associativity.

While the invention has been shown and described with reference to particular embodiments thereof, it will be understood by those skilled in the art that the foregoing and other changes in form and detail may be made therein without departing from the spirit and scope of the invention.

What is claimed is:

1. An improved cache memory system, comprising:
    a plurality of cache lines in a cache;
    at least one redundant unmapped cache line in said cache; and
    means for signaling said cache to access one of said plurality of cache lines or said at least one redundant unmapped cache line, wherein said at least one redundant unmapped cache line is used as a temporary cache location without displacing or overwriting any of said plurality of cache lines such that memory-access time is effectively and efficiently reduced.

2. A cache memory having a main array and a redundant array, said redundant array comprising mapped and unmapped cache lines, comprising:
    first access means for accessing said main array;
    second access means for accessing said mapped cache lines; and
    third access means for accessing said unmapped cache lines, wherein said unmapped cache lines are used as temporary cache locations without displacing or overwriting any contents within said main array such that memory-access time is effectively and efficiently reduced.

3. The system of claim 2 wherein said mapped cache lines are a logical overlay to said main array.

4. The system of claim 2 wherein said unmapped cache line are a logical extension to said main array.

5. A method for accessing a cache memory having a main array and a redundant array, said main array having at least one main cache line and said redundant array having at least one redundant unmapped cache line, comprising the steps of:
    generating an address for a memory location of said main array;
    accessing a cache line corresponding to said address;
    generating a signal to access said redundant array; and
    accessing a redundant unmapped cache line in said redundant array.

6. A method for accessing a cache memory having a main array and a redundant array, said main array and said redundant array having a plurality of memory locations, comprising the steps of:
    generating an address for a memory location of said main array;
    reading or writing first data into at least one of said plurality of memory locations of said main array;
    generating a signal to access said redundant array; and
    reading or writing second data into said redundant array without displacing said first data.

7. A method for accessing a cache memory having a main array and at least one redundant unmapped cache line, said main array having a plurality of memory locations, comprising the steps of:
    generating a signal to access said at least one redundant unmapped cache line; and
    accessing said at least one redundant unmapped cache line without altering contents of said plurality of memory locations.

8. A method for accessing a cache memory having a main array and a redundant array, said main array having at least one main cache line and said redundant array having at least one redundant cache line, comprising the steps of:
    generating a signal to access said redundant array; and
    accessing a redundant cache line in said redundant array without displacing said at least one main cache line in said main array.

9. A system for accessing a cache memory having a main array and a redundant array, said main array having at least one main cache line and said redundant array having at least one redundant cache line, comprising:
    means for generating an address for a memory location of said main array;
    means for accessing a cache line corresponding to said address;
    means for generating a signal to access said redundant array; and
    means for accessing a redundant cache line in said redundant array without displacing said at least one main cache line in said main array.

10. A system for accessing a cache memory having a main array and a redundant array, said main array and said redundant array having a plurality of memory locations, comprising:
    means for generating an address for a memory location of said main array;
    means for reading or writing first data into at least one of said memory locations of said main array;
    means for generating a signal to access said redundant array; and
    means for reading or writing second data into said redundant array without displacing said first data.

11. A system for accessing a cache memory having a main array and at least one redundant unmapped cache line, said main array having a plurality of memory locations, comprising:

means for generating a signal to access said at least one redundant unmapped cache line; and means for accessing said at least on redundant unmapped cache line without altering contents of said plurality of memory locations.

12. A system for accessing a cache memory having a main array and a redundant array, said main array having at least one main cache line and said redundant array having at least one redundant cache line, comprising:

means for generating a signal to access said redundant array; and means for accessing a redundant cache line in said redundant array without displacing said at least one main cache line in said main array.

13. A system for accessing a cache memory having a main array and a redundant unmapped array, said main array and said redundant array having a plurality of memory locations, comprising:

a central processing unit coupled to said cache memory;

a main memory coupled to said cache memory;

means for generating an address by said central processing unit for a memory location of said main memory;

means for reading or writing first data into said memory location of said main array;

means for generating a signal by said central processing unit to access said redundant unmapped array; and means for reading or writing second data into said redundant unmapped array without displacing said first data.

\* \* \* \* \*

UNITED STATES PATENT AND TRADEMARK OFFICE
CERTIFICATE OF CORRECTION

| | |
|---|---|
| PATENT NO. | : 6,754,791 B1 |
| APPLICATION NO. | : 08/599227 |
| DATED | : June 22, 2004 |
| INVENTOR(S) | : Braceras et al. |

It is certified that error appears in the above-identified patent and that said Letters Patent is hereby corrected as shown below:

Please change Claims 1-13 as follows:

1. An improved cache memory system, comprising:
a plurality of cache lines in a cache;
at least one redundant unmapped cache line in said cache; and
means for signaling said cache to access one of said plurality of cache lines or said at least one redundant unmapped cache line, wherein said at least one redundant unmapped cache line is used as a temporary cache location without displacing or overwriting any of said plurality of cache lines.

2. A cache memory having a main array and a redundant array, said redundant array comprising mapped and unmapped cache lines, comprising:
first access means for accessing said main array;
second access means for accessing said mapped cache lines; and
third access means for accessing said unmapped cache lines, wherein said unmapped cache lines are used as temporary cache locations without displacing or overwriting any contents within said main array.

3. The system of Claim 2 wherein said mapped cache lines are a logical overlay to said main array.

4. The system of Claim 2 wherein said unmapped cache lines are a logical extension to said main array.

5. A method for accessing a cache memory having a main array and a redundant array, said main array having at least one main cache line and said redundant array having at least one redundant unmapped cache line, comprising the steps of:
generating an address for a memory location of said main array;
accessing a cache line corresponding to said address;
generating a signal to access said redundant array; and
accessing a redundant unmapped cache line in said redundant array, wherein said redundant unmapped cache line is used as a temporary cache location without displacing or overwriting any contents within said main array.

UNITED STATES PATENT AND TRADEMARK OFFICE
CERTIFICATE OF CORRECTION

| | | |
|---|---|---|
| PATENT NO. | : 6,754,791 B1 | Page 2 of 4 |
| APPLICATION NO. | : 08/599227 | |
| DATED | : June 22, 2004 | |
| INVENTOR(S) | : Braceras et al. | |

It is certified that error appears in the above-identified patent and that said Letters Patent is hereby corrected as shown below:

6. A method for accessing a cache memory having a main array and a redundant array, said main array and said redundant array having a plurality of memory locations, comprising the steps of:
generating an address for a memory location of said main array;
reading or writing first data into at least one of said plurality of memory locations of said main array; generating a signal to access said redundant array; and
reading or writing second data into said redundant array without displacing said first data, wherein said redundant array is utilized as a temporary cache location.

7. A method for accessing a cache memory having a main array and at least one redundant unmapped cache line, said main array having a plurality of memory locations, comprising the steps of:
generating a signal to access said at least one redundant unmapped cache line; and
accessing said at least one redundant unmapped cache line without altering contents of said plurality of memory locations, wherein said at least one redundant unmapped cache line is utilized as a temporary cache location.

8. A method for accessing a cache memory having a main array and a redundant array, said main array having at least one main cache line and said redundant array having at least one redundant cache line, comprising the steps of:
generating a signal to access said redundant array; and
accessing a redundant cache line in said redundant array without displacing said at least one main cache line in said main array, wherein said redundant array is utilized as a temporary cache location to said main array.

9. A system for accessing a cache memory having a main array and a redundant array, said main array having at least one main cache line and said redundant array having at least one redundant cache line, comprising:
means for generating an address for a memory location of said main array;
means for accessing a cache line corresponding to said address;
means for generating a signal to access said redundant array; and
means for accessing a redundant cache line in said redundant array without displacing said at least one main cache line in said main array, wherein said redundant cache line is used as a temporary cache location to said

UNITED STATES PATENT AND TRADEMARK OFFICE
CERTIFICATE OF CORRECTION

| | |
|---|---|
| PATENT NO. | : 6,754,791 B1 |
| APPLICATION NO. | : 08/599227 |
| DATED | : June 22, 2004 |
| INVENTOR(S) | : Braceras et al. |

It is certified that error appears in the above-identified patent and that said Letters Patent is hereby corrected as shown below:

9. A system for accessing a cache memory having a main array and a redundant array, said main array having at least one main cache line and said redundant array having at least one redundant cache line, comprising:
means for generating an address for a memory location of said main array;
means for accessing a cache line corresponding to said address;
means for generating a signal to access said redundant array; and
means for accessing a redundant cache line in said redundant array without displacing said at least one main cache line in said main array, wherein said redundant cache line is used as a temporary cache location to said at least one main cache line in said main array.

10. A system for accessing a cache memory having a main array and a redundant array, said main array and said redundant array having a plurality of memory locations, comprising:
means for generating an address for a memory location of said main array;
means for reading or writing first data into at least one of said memory locations of said main array; means for generating a signal to access said redundant array; and
means for reading or writing second data into said redundant array without displacing said first data, wherein said redundant array is utilized as a temporary cache location to said main array.

11. A system for accessing a cache memory having a main array and at least one redundant unmapped cache line, said main array having a plurality of memory locations, comprising:
means for generating a signal to access said at least one redundant unmapped cache line; and
means for accessing said at least on redundant unmapped cache line without altering contents of said plurality of memory locations, wherein said at least one redundant un mapped cache line is utilized as a temporary cache location to said main array.

12. A system for accessing a cache memory having a main array and a redundant array, said main array having at least one main cache line and said redundant array having at least one redundant cache line, comprising:
means for generating a signal to access said redundant array; and
means for accessing a redundant cache line in said redundant array without displacing said at least one main cache line in said main array, wherein said redundant cache line is utilized as a temporary cache location to said main array.

UNITED STATES PATENT AND TRADEMARK OFFICE
CERTIFICATE OF CORRECTION

PATENT NO. : 6,754,791 B1
APPLICATION NO. : 08/599227
DATED : June 22, 2004
INVENTOR(S) : Braceras et al.

It is certified that error appears in the above-identified patent and that said Letters Patent is hereby corrected as shown below:

13. A system for accessing a cache memory having a main array and a redundant un mapped array, said main array and said redundant array having a plurality of memory locations, comprising:
a central processing unit coupled to said cache memory;
a main memory coupled to said cache memory;
means for generating an address by said central processing unit for a memory location of said main memory; means for reading or writing first data into said memory location of said main array;
means for generating a signal by said central processing unit to access said redundant unmapped array, wherein said redundant unmapped array is utilized as a temporary cache location to said main array; and means for reading or writing second data into said redundant unmapped array without displacing said first data.

Signed and Sealed this

Thirty-first Day of October, 2006

JON W. DUDAS
*Director of the United States Patent and Trademark Office*